United States Patent [19]  [11] 4,199,487
Nakayama et al.  [45] Apr. 22, 1980

[54] AQUEOUS RESIN COMPOSITION CROSS-LINKABLE BY OXIDATION

[75] Inventors: Yasuharu Nakayama; Tetsuo Aihara, both of Hiratsuka, Japan

[73] Assignee: Saegusa International Patent Office, Osaka, Japan

[21] Appl. No.: 895,081

[22] Filed: Apr. 10, 1978

[30] Foreign Application Priority Data

Apr. 22, 1977 [JP] Japan .................................. 52/46523

[51] Int. Cl.$^2$ .............................................. C08L 33/06
[52] U.S. Cl. ............................... 260/23 AR; 260/23 R; 260/23 EP; 260/23 EM; 260/23.7 A; 260/29.7 W; 260/29.7 UP
[58] Field of Search .......... 260/23 R, 23 AR, 23 EM, 260/23.5 R, 23.7 A, 29.6 NR, 29.7 NR, 29.7 RP, 29.7 D, 29.7 DP, 29.7 UA, 29.7 W, 29.7 UP

[56] References Cited

U.S. PATENT DOCUMENTS

| 3,404,110 | 10/1968 | Hunt | 260/23 AR |
|---|---|---|---|
| 3,506,601 | 4/1970 | Sekmakas | 260/29.6 NR |
| 3,674,731 | 7/1972 | Guldenpfenning | 260/23 AR |
| 3,880,793 | 4/1975 | Nakayama | 260/29.7 UP |
| 3,988,273 | 10/1976 | Tetsuo | 260/23 AR |
| 4,073,758 | 2/1978 | Nakayama | 260/23.7 A |
| 4,075,135 | 2/1978 | Jozwiak | 260/29.7 DP |
| 4,075,148 | 2/1978 | Zatmann | 260/23.7 A |

Primary Examiner—Paul R. Michl
Attorney, Agent, or Firm—Larson, Taylor and Hinds

[57] ABSTRACT

An aqueous resin composition cross-linkable by oxidation and prepared by dissolving a radical-polymerizable poly-functional monomer in an aqueous solution of at least one of water-soluble resins having a drying oil fatty acid group or semi-drying oil fatty acid group and neutralized maleates of synthetic petroleum resins having an unsaturated bond of the vinyl or non-vinyl type, and polymerizing the monomer in the solution.

1 Claim, No Drawings

AQUEOUS RESIN COMPOSITION CROSS-LINKABLE BY OXIDATION

This invention relates to quick drying aqueous resin compositions which are cross-linkable by oxidation.

Water-soluble resins which are cross-linkable by oxidation heretofore known and used include maleinized drying oils, maleinized semi-drying oils, alkyd resins modified with drying or semi-drying oil fatty acids, maleinized alkyd resins, polybutadiene, epoxy resins modified with drying or semi-drying oil fatty acids and acrylic or vinyl resins modified with drying or semi-drying oil fatty acids. Coating compositions prepared from these resins have the drawbacks that the compositions, when applied, form coatings of poor initial hardness and are prone to result excessive surface drying (i.e. the phenomenon in which the interior of the coating remains in the state of semi-liquid owing to delayed curing). Most preferably such drawbacks can be overcome by the use of resins of increased molecular weight, but the resins of the type described invariably involve limitations on the degree to which they are polymerizable because of high viscous property and gelling tendency. Accordingly even when polymerized to the highest possible degree, the resins still remain to be improved to fully overcome the foregoing drawbacks. Moreover resins of increased molecular weight are not readily soluble in water. Although it has been attempted to eliminate the drawbacks by styrenating resins of the oxidation cross-linkable type in the case of those composed of drying oils or alkyd resins, the same difficulties as with the polymerized resins are encountered with the resulting resins.

To provide coatings of improved initial hardness, it is known to use the above-mentioned resins in the form of an emulsion. However, such emulsions give coatings which are not fully glossy, have reduced toughness due to unequal cross linking and are susceptible to marked skinning leading to popping particularly in the case of high temperature baking.

An object of this invention is to provide aqueous resin compositions which are cross-linkable by oxidation to give coatings of high initial hardness.

Another object of this invention is to provide aqueous resin compositions of the oxidation cross-linkable type for forming coatings which are quickly curable throughout in the interior thereof free of any excessive surface drying and form the highly glossy and pop-free film after drying or baking.

Another object of thhis invention is to provide aqueous resin compositions of the oxidation cross-linkable type which are prepared without resorting to styrenation and which are capable of giving coatings of high initial hardness free of any excessive surface drying.

Still another object of this invention is to provide aqueous resin compositions, cross-linkable by oxidation, which are prepared from a water-soluble resin utilizing the properties thereof to advantage instead of formulating an emulsion and thereby fully overcoming the drawbacks of water-soluble resins heretofore known.

These and other objects and features of this invention will become apparent from the following description.

This invention provides aqueous resin compositions which are cross-linkable by oxidation and which are prepared by dissolving a radical-polymerizable poly-functional monomer in an aqueous solution of at least one of water-soluble resins having a drying oil fatty acid group or semi-drying oil fatty acid group and neutralized maleates of synthetic petroleum resins having an unsaturated bond of the vinyl or non-vinyl type, and polymerizing the monomer in the solution.

Our research conducted in order to eliminate the drawbacks of conventional water-soluble resins of the oxidation cross-linkable type has revealed that water-soluble resins having a drying oil fatty acid group or semi-drying oil fatty acid group and neutralized maleates of synthetic petroleum resins having a vinyl or non-vinyl type unsaturated bond, when dissolved in water singly or in combination, are in a form resembling microfine balls of threads and that a radical-polymerizable poly-functional monomer, when polymerized as dissolved in the solution, gives a polymer which is in the form of microfine particles of a gel without causing the gelation of the whole mixture. When a mono-functional monomer useful for the preparation of emulsions is used singly for the preparation of aqueous resin compositions of the oxidation cross-linkable type, the functional group contained in the resin will serve as a chain transfer agent against radical polymerization, making it impossible to obtain the desired polymer of increased molecular weight, whereas our research has also shown that the use of the radical-polymerizable polyfunctional monomer eliminates the drawback resulting from the use of the mono-functional monomer. It is therefore thought that the aqueous resin compositions of this invention have the structure in which the water-soluble resin of the oxidation cross-linkable type extends from the microfine gel-like particles of the polymer formed from the radical-polymerizable poly-functional monomer.

Examples of useful water-soluble resins having a drying or semi-drying oil fatty acid group are neutralized products of maleinized oil, maleinized stand oil, maleinized boiled oil, fatty acid modified alkyd resin, maleinized alkyd resin, fatty acid modified epoxy resin, fatty acid modified urethane resin, fatty acid modified acrylic resin, fatty acid modified vinyl resin and water-soluble spiran resin.

Oils and fatty acids useful for the preparation of these water-soluble resins include, for example, safflower oil, linseed oil, soybean oil, perilla oil, hemp seed oil, grape kernel oil, corn oil, tall oil, cotton seed oil, walnut oil, rubber seed oil and fatty acids of these oils. Also usable are tung oil, oiticica oil, dehydrated castor oil, "High-diene" fatty acid and fatty acids of these oils. It is preferable to use safflower oil or tall oil which is least likely to adversely affect the reaction. Preferably these resins have an oil length of at least about 15, more preferably at least about 25. When having an oil length of at least about 15, the resins are fully cross-linkable by oxidation as desired. The resins are neutralized with a base such as ammonia, amines or alkali metal compounds in the usual manner. Amines include primary, secondary and third amines and examples of alkali metal compounds are sodium hydroxide, potassium hydroxide, etc. The resins are rendered water-soluble on neutralization.

Examples of useful synthetic petroleum resins having an unsaturated bond of the vinyl or non-vinyl type are polymers of diene monomers having 4 to 8 carbon atoms, such as butadiene, pentadiene, cyclopentadiene, hexadiene, heptadiene, octadiene, etc.; and copolymers of at least 10 wt. % of these dienes and unsaturated monomers such as olefins having 2 to 8 carbon atoms, styrene, α-methylstyrene, vinyltoluene, acrylonitrile, methacrylonitrile, chloroprene, and esters of alcohols having 1 to 18 carbon atoms and acrylic acid or methacrylic acid.

Synthetic petroleum resins useful in this invention also include modified products of the above-mentioned synthetic petroleum resins, such as cyclized, epoxidized and hydrogenated products and hydroxylated product thereof. The synthetic petroleum resins can be modified as desired by known methods. These synthetic petroleum resins are maleinized and then rendered water-soluble by neutralization for use in this invention. The neutralization is conducted by the same manner as discribed before. The maleinization is effected by the known method to such an extent that the maleinized synthetic petroleum resin will have an acid value of 20 to 350, preferably 40 to 250. Resins with an acid value of 20 to 350 have high solubility in water, giving coatings of high resistance to water.

Most preferable as the foregoing resins are those disclosed in Published Unexamined Japanese Patent Application No. 126723/1975, because the disclosed resins are prepared by radical polymerization which deactivates specific active group having a polymerization inhibiting action and therefore permit smooth polymerization of the poly-functional monomer and further because the main chain of the resins is highly compatible with the poly-functional monomer.

Those disclosed resins are neutralized copolymers of (a) a monomer prepared by being allowed at least one glycidyl ester of α-ethylenically unsaturated carboxylic acids to react with at least one unsaturated acid having non-conjugated double bond, (b) at least one of α,β-ethylenically unsaturated acids and (c) at least one of unsaturated monomers containing substantially no carboxyl group and having a Q value of at leat 0.1 as determined by Q-etheory. Also preferable are maleinized alkyd resins, maleinized epoxy resins, maleinized acrylic resins and maleinized vinyl resins since the polymerization inhibiting specific active site has relatively been deactivated in the course of the maleinization.

According to this invention, at least one of the water-soluble resins having a drying or semi-drying oil fatty acid group and neutralized maleates of the synthetic petroleum resins having a vinyl or non-vinyl type unsaturated bond is used as dissolved in water or in a mixture of water and an organic solvent miscible with water. Useful organic solvents are a wide variety of those miscible with water. The aqueous solution should have a concentration of about 5 to about 85% by weight, preferably about 15 to about 70% by weight.

The radical-polymerizable poly-functional monomers useful in this invention must be highly amenable to radical polymerization. Examples of useful monomers are esters of polyhydric alcohols having 2 to 6 functional groups and acrylic acid or methacrylic acid; ester of glycidyl acrylate or glycidyl methacrylate and acrylic acid or methacrylic acid; esters of polycarboxylic acids having 2 to 4 functional groups and glycidyl acrylate, glycidyl methacrylate, hydroxyethyl acrylate, hydroxyethyl methacrylate, hydroxypropyl acrylate or hydroxypropyl methacrylate; esters of poly epoxy compounds having 2 to 4 functional groups and hydroxyethyl acrylate, hydroxyethyl methacrylate, hydroxypropyl acrylate, hydroxypropyl methacrylate, acrylic acid or methacrylic acid; divinylbenzene; adducts of polyisocyanates having 2 to 4 functional groups and hydroxyethyl acrylate, hydroxyethyl methacrylate, hydroxypropyl acrylate, hydroxypropyl methacrylate, acrylic acid or methacrylic acid; etc. Also usable are adducts of epoxy polymers of relatively low molecular weight (up to 2,000, preferably up to 500, in number average molecular weight) or compounds containing a hydroxyl, epoxy or carboxyl group and acrylic acid, methacrylic acid, glycidyl acrylate, glycidyl methacrylate, hydroxyethyl acrylate, hydroxyethyl methacrylate, hydroxypropyl acrylate or hydroxypropyl methacrylate. Further usable are adducts prepared from the hydroxyl- containing monomers mentioned above and methylolated melamine, urea or ethyl silicate by ether exchange reaction. Preferable among these radical-polymerizable poly-functional monomers are the esters of polyhydric alcohols having 2 to 6 functional groups and acrylic acid or methacrylic acid; ester of glycidyl acrylate or glycidyl methacrylate and acrylic acid or methacrylic acid; esters of polycarboxylic acid having 2 to 4 functional groups and glycidyl acrylate, glycidyl methacrylate, hydroxyethyl acrylate, hydroxyethyl methacrylate, hydroxypropyl acrylate or hydroxypropyl methacrylate; esters of polyepoxy compounds having 2 to 4 functional groups and acrylic acid or methacrylic acid; and divinylbenzene.

According to this invention it is desirable to use at least one of the monomers given above. These monomers are usable conjointly with a radical-polymerizable mono-functional monomer. The mono-functional monomer is used in an amount of up to 80% by weight, preferably up to 40% weight, based on the combined amount of the monomers used. If more than 80% by weight of the mono-functional monomer is used, low molecular weight polymers which have non-fixing property on the water-soluble resins will be produced in the polymerization system, and, consequently, a solution thus prepared will become so close to an emulsion that the low molecular weight polymers are prone to flocculate in the system and result in even larger particles.

Examples of useful mono-functional monomers are the esters represented by the formula $CH_2=C(R_1)COOR_2$ wherein $R_1$ is hydrogen or $CH_3$, and $R_2$ is alkyl having 1 to 26 carbon atoms; esters represented by the formula $CH_2=C(R_1)COOR_3$ wherein $R_1$ is as defined above, and $R_3$ is

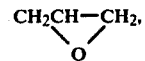

$CH_2CH(OH)CH_2OCOR_4$, $(CH_2CH_2O)_nR_5$, $[CH_2CH(CH_3)O]_nR_5$, $CH_2CH(CH_3)OH$ or $CH_2CH_2CH_2OH$, $R_4$ is hydrogen or alkyl having 1 to 25 carbon atoms, $R_5$ is hydrogen or alkyl having 1 to 8 carbon atoms, and n is an integer of 1 to 8; and styrene, vinyltoluene, α-methylstyrene, acrylonitrile, methacrylonitrile, vinyl acetate, VEOVA (trade mark of vinyl ester of synthetic tertiary carboxylic acid, the product of Shell Chemical Co., U.S.A., proposed general formula:

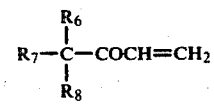

wherein $R_6$, $R_7$ and $R_8$ are alkyl and at least one of them is $CH_3$), adducts of glycidyl acrylate or methacrylate and fatty acids, acrylic acid, methacrylic acid; carboxylic acid amides represented by the formula $CH_2=C(R_9)CONHR_{10}$ wherein $R_9$ is hydrogen or $CH_3$ and $R_{10}$ is hydrogen, $-CH_2OH$ or $-CH_2OC_4H_9$, N-methylacrylamide, N-ethylacrylamide, dimethylaminoethyl methacrylate, diethylaminoethyl methacrylate, vinyl pyridine, vinyl pyrrolidone, among which the esters represented by the formula $CH_2=C(R_1)COOR_2$; esters represented by the formula $CH_2=C(R_1)COOR_3$; and styrene, vinyltoluene, α-methylstyrene, methacrylonitrile, hydroxypropyl methacrylate, hydroxypropyl acrylate, hydroxyethyl methacrylate, N-butoxymethyl acrylamide, vinyl acetate, VEOVA, adducts of glycidyl acrylate or methacrylate and fatty acids, acrylic acid and methacrylic acid are preferable.

According to this invention, the radical-polymerizable poly-functional monomer is used in the ratio by weight of from 1/100 to 2/1, preferably from about 3/100 to about 1/1, based on the water-soluble resin and/or the neutralized maleate of synthetic, petroleum resin. If this ratio is less than 1/100, the expected effect of poly-functional monomers is not distinctly observed, whereas if it is more than 2/1, the resulting composition is very likely to have the properties of an emulsion, hence undesirable.

The radical-polymerizable monomer is polymerized in the presence of an initiator at a temperature of above the freezing point of the solvent and below the boiling point thereof, preferably 0° to 100° C. For this reaction any radical producing initiators are usable such as gamma rays and like ionizing radiations, peroxides and azo-type initiators. The concentration of the reaction system is usually about 10 to about 60% by weight.

The aqueous resin compositions of the oxidation cross-linkable type according to this invention are used as the mixed system with other known water soluble resins as well as the single usage and useful as coating compositions and also for a wide range of applications as for precessing resins. For coating purposes, pigments and other additives may be incorporated into the compositions in the usual manner.

For a better understanding of the present invention, examples and comparison examples will be given below in which the parts and percentages are all by weight unless otherwise specified.

EXAMPLE 1

A monomer prepared by the addition reaction of glycidyl methacrylate with safflower oil fatty acid, styrene, n-butyl methacrylate and acrylic acid are mixed together in the ratio by weight of 60/14/14/12. The mixture is subjected to radical polymerization in butyl cellosolve (ethylene glycol mono-butyl ether) to obtain a water soluble resin A which is cross-linkable by oxidation and which has an oil length of 40, an acid value of 80 and a peak molecular weight of about 7,000 to about 8,000. The resin is neutralized with an equivalent of triethylamine and then formulated into an aqueous solution containing butyl cellosolve. The solution is placed into a four-necked flask and heated to 80° C. with stirring in a nitrogen gas atmosphere. To the solution is added 1,6-hexanediol diacrylate (containing azobisdimethylvaleronitrile dissolved therein in a quantity corresponding to 10% of the monomer quantity) in an amount corresponding to 10% of the amount of the water-soluble resin to prepare a transparent solution. The solution is maintained at 80° C. for 7 hours to obtain an aqueous resin composition of the oxidation cross-linkable type.

Table 1 shows the properties of the composition and Table 2 those of the coating formed from the composition. The properties of the composition are expressed in terms of the ratio between the viscosities measured by a Brookfield viscometer at two different speeds of rotation. Coated panels are prepared by applying the composition (incorporating 0.05% Co, 0.05% Mn and, 0.15% Pb as respectively metal content and 0.5% Active-8 (drier manufactured by R.T. Van-derbilt Co., U.S.A.) in the form of a drier) to a polished mild steel panel by a bar coater to a thickness of 25 to 30 μ and baking the panel at 80° C. for 20 minutes or drying the panel at 20° C. for 7 days. The panels are tested for the properties of the coating. The panel tested for the gloss of the coating is prepared in the same manner as above except that the composition contains 80 PHR of titanium white.

EXAMPLES 2 TO 5 AND COMPARISON EXAMPLES 1 and 2

Aqueous resin compositions are prepared in the same manner as in Example 1 except the conditions listed in Table 1. Table 1 also shows the properties of the compositions, and Table 2 the properties of the coatings prepared from the compositions.

Table 1

| Example | Water-soluble resin | Amount of monomer (in PHR, based on water soluble resin) | | Amount of butyl cello-solve (PHR) | Solids (%)[4] | | Properties[5] | |
|---|---|---|---|---|---|---|---|---|
| | | | | | Calcd. | Found | Viscosity ratio (6 rpm/30 rpm) | Appearance |
| Ex. 1 | A | 1,6-H D D A[1] | 10 | 45.5 | 37.6 | 37.5 | 1.0 | Transparent |
| 2 | A | 1,6-H D D A | 20 | 41.7 | 29.0 | 29.6 | 1.0 | Transparent |
| 3 | A | 1,6-H D D A | 50 | 33.3 | 36.3 | 37.0 | 1.2 | Slightly white |
| 4 | A | Divinylbenzene | 5 | 47.7 | 34.7 | 35.0 | 1 | Transparent |
| 5 | A | N K ESTER[2] | 10 | 45.5 | 37.6 | 37.4 | 1.1 | Transparent |
| Comp. Ex. 1 | A | None | | 50.0 | 34.8 | — | 0.95 | Transparent |
| 2 | A | n-B M A[3] | 10 | 45.5 | 37.6 | 36.8 | 1.0 | Transparent |

Notes:
[1]1,6-Hexanediol diacrylate.
[2]Pentaerythritol triacrylate, product of Shin-Nakamura Chemical Co., Ltd., Japan.
[3]n-Butyl methacrylate.
[4]Comparison between the two values indicates that the monomer has been polymerized.
[5]As this value increases, the composition becomes thixotropic and has a closer resemblance to an amulsion.

Table 2

| | Baking at 80° C. for 20 min | | | Drying at 20° C. for 7 days | | | | | | |
| | | | | Variations in pencil hardness | | | | | | |
| Example | Pencil hardness | Water resistance | Gel fraction ratio | 1st day | 2nd day | 4th day | 7th day | Water resistance | Gel fraction ratio | Gloss (60°) |
| --- | --- | --- | --- | --- | --- | --- | --- | --- | --- | --- |
| Ex. 1 | 4B | b | 60.9 | 6B< | 3B | 2B | B | d | 65.3 | 82 |
| 2 | 3B | a | 66.7 | 6B< | B | B | B | d | 68.3 | 77 |
| 3 | B | a | 72.6 | 6B | B | B | B | a | 70.0 | 65 |
| 4 | 4B | b | 54.4 | 6B< | 2B | 2B | B | d | 67.2 | 83 |
| 5 | 4B | a | 63.6 | 6B | 3B | B | B | d | 68.4 | 80 |
| Comp. Ex. 1 | 6B< | b | 40.0 | 6B< | 5B | 4B | 4B | d | 60.0 | 83 |
| Comp. Ex. 2 | 6B< | b | 45.0 | 6B< | 4B | 4B | 3B | d | 63.5 | 80 |

Note:
Test methods and evaluation procedures are cited at the end of the specification.

EXAMPLE 6 AND COMPARISON EXAMPLE 3

A 269 g of 1,1,1-trimethylol propane, 213 g of phthalic anhydride, 3.8 g of trimellitic anhydride, 402 g of safflower oil fatty acid, 156 g of benzoic acid, 2 g of di-n-butyl tin oxide and 50 g of xylene are placed into a 2-liter four-necked flask and heated at 230° C. in a nitrogen atomosphere for 4 hours to obtain a fatty acid modified alkyd resin having an acid value of 13.3. A 96 g of maleic anhydride is added to the alkyd resin solution and the mixture is maleinized at 190° C. for 3 hours. The excess maleic anhydride and xylene are removed from the maleinized product solution under a reduced pressure. The product hereinbefore is subjected to a ring cleavage reaction by adding 22 g of water, thus the maleinized alkyd resin B having a total acid value of 71 is obtained. The resin is neutralized with an equivalent of triethylamine and formulated into an aqueous solution with addition of butyl cellosolve. In the same manner as in Example 1, the poly-functional monomer listed in Table 3 is added to the solution and polymerized to prepare an aqueous resin composition of the oxidation cross-linkable type. The composition is slightly hazy at 80° C. but is transparent at room temperature. Table 3 shows the properties of the composition, and Table 4 those of the coatings prepared therefrom.

EXAMPLE 7

A 548 g of phthalic anhydride, 710 g of pentaerythritol, 1704 g of linseed oil fatty acid, 779 g of benzoic acid, 7 g of di-n-butyl tin oxide and 150 g of xylene are placed into a 5-liter four-necked flask and heated at 235° C. in a nitrogen atomosphere for 7 hours to obtain a fatty acid modified alkyd resin having an acid value of 5.5. A 325 g of maleic anhydride is added to the alkyd resin solution and the mixture is maleinized at 190° C. for 4 hours. The excess maleic anhydride and xylene are removed from the maleinized product solution under a reduced pressure. the product hereinbefore is subjected to a ring cleavage reaction by adding 90 g of water, thus the maleinized alkyd resin C having a total acid value of 80.3 is obtained. The resin is neutralized with an equivalent of triethylamine and formulated into an equeous solution with addition of butyl cellosolve. In the same manner as in Example 1, the poly-functional monomer listed in Table 3 is added to the solution and polymerized to prepare an aqueous resin composition of the oxidation cross-linkable type. The composition is tested for properties with the results given in Tables 3 and 4.

EXAMPLES 8 TO 10 AND COMPARISON EXAMPLES 4 AND 5

Aqueous resin compositions are prepared in the same manner as in Example 1 except the conditions listed in Table 3. The compositions are tested for properties with the results given in Tables 3 and 4.

Table 3

| | | Conditions for the preparation of water-soluble resin | | | | | Properties*5 | |
| Example | Water soluble resin | Amount of monomer (in PHR, based on water soluble resin) | | Amount of butyl cellosolve (PHR) | Solids (%)*4 | | Viscosity ratio | |
| | | | | | Calcd. | Found | (6 rpm/30 rpm) | Appearance |
| --- | --- | --- | --- | --- | --- | --- | --- | --- |
| Ex. 6 | B | 1,6-H D D A | 10 | 63 | 31.7 | 30.9 | 1.0 | Transparent |
| Comp. Ex. 3 | B | None | | 63 | 34.9 | — | 0.98 | Transparent |
| Ex. 7 | C | 1,6-H D D A | 10 | 30.4 | 34.4 | 33.1 | 0.95 | Transparent |
| 8 | C | 1,6-H D D A | 20 | 27.8 | 35.3 | 33.2 | 1.0 | Transparent |
| 9 | C | Divinylbenzene | 5 | 31.9 | 33.0 | 32.5 | 1.0 | Transparent |
| 10 | C | N K ESTER | 10 | 30.4 | 34.4 | 34.0 | 1.1 | Transparent |
| Comp. Ex. 4 | C | None | | 41.2 | 32.5 | — | 1.0 | Transparent |
| 5 | C | n-B M A | 10 | 30.4 | 34.4 | 32.0 | 1.0 | Transparent |

Table 4

| | Baking at 80° C. for 20 min | | | Drying at 20° C. for 7 days | | | | | | |
| | | | | Variations in pencil hardness | | | | | | |
| Example | Pencil hardness | Water resistance | Gel fraction ratio | 1st day | 2nd day | 4th day | 7th day | Water resistance | Gel fraction ratio | Gloss (60°) |
| --- | --- | --- | --- | --- | --- | --- | --- | --- | --- | --- |
| Ex. 6 | 4B | b | 63.8 | 6B< | 3B | 3B | B | c | 57.6 | 87 |
| Comp. Ex. 3 | 6B< | d | 42.3 | 6B< | 4B | 3B | 2B | c | 49.1 | 90 |

Table 4-continued

| | Baking at 80° C. for 20 min | | | Drying at 20° C. for 7 days | | | | | | | |
| | | Water | Gel frac- | Variations in pencil hardness | | | | Water | Gel frac- | | |
| Example | Pencil hardness | resist- ance | tion ratio | 1st day | 2nd day | 4th day | 7th day | resist- ance | tion ratio | | Gloss (60°) |
| --- | --- | --- | --- | --- | --- | --- | --- | --- | --- | --- | --- |
| Ex. 7 | 6B | b | 50.9 | 6B | 4B | 3B | 2B | c | 55.0 | 89 | |
| 8 | 4B | a | 52.1 | 6B | 4B | 3B | B | b | 57.9 | 87 | Slight yellowing |
| 9 | 6B | b | 40.2 | 6B | 4B | 3B | B | d | 43.2 | 90 | |
| 10 | 6B | b | 42.8 | 6B | 4B | 2B | 2B | c | 47.3 | 88 | |
| Comp. Ex. 4 | 6B< | d | 22.8 | 6B< | 6B | 4B | 3B | d | 35.1 | 91 | |
| Comp. Ex. 5 | 6B< | d | 25.5 | 6B< | 6B | 4B | 3B | d | 39.2 | 93 | |

Test methods and evaluation procedures
Pencil hardness:

The coating is scratched with pencils ("MITSUBISHI UNI," product of Mitsubishi Pencil Co., Japan) of varying hardnesses to determine the pencil of the highest hardness producing no scratches in the coating. The hardness of the coating is expressed in terms of the pencil hardness thus determined. Water resistance:

The coated panel is immersed in water at 20° C. for one day (24 hours) and thereafter checked for changes produced in the coating. The results are evaluated according to the following criteria:

a: no defect (Good) b: slight whitening (Fair) c: whitening (Poor) d: whitening with reduced gloss (Bad)

Gel fraction ratio:

Calculated from the difference in the weight of the coating resulting from the extraction of the coating with acetone.

What we claim is:

1. An aqueous resin composition cross-linkable by oxidation and prepared by dissolving a radical-polymerizable poly-functional monomer in an aqueous solution of at least one of water-soluble resins having a drying oil fatty acid group or semi-drying oil fatty acid group and neutralized maleates of synthetic petroleum resins having an unsaturated bond of the vinyl or non-vinyl type, and polymerizing the monomer in the solution, said radical-polymerizable poly-functional monomer being at least one species selected from the group consisting of esters of polyhydric alcohols having 2 to 6 functional groups and acrylic acid or methacrylic acid; ester of glycidyl acrylate or glycidyl methacrylate and acrylic acid or metacrylic acid; esters of polycarboxylic acids having 2 to 4 functional groups and glycidyl acrylate, glycidyl methacrylate, hydroxyethyl acrylate, hydroxyethyl methacrylate, hydroxypropyl acrylate or hydroxypropyl methacrylate; esters of polyepoxy compounds having 2 to 4 functional groups and hydroxyethyl acrylate, hydroxyethyl methacrylate, hydroxypropyl acrylate, hydroxypropyl methacrylate, acrylic acid or methacrylic acid; adducts of polyisocyanates having 2 to 4 functional groups and hydroxyethyl acrylate, hydroxyethyl methacrylate, hydroxypropyl acrylate, hydroxypropyl methacrylate, acrylic acid or methacrylic acid; divinyl benzene; adducts of epoxy polymers of relatively low molecular weight (up to 2,000 in number average molecular weight) or compounds containing a hydroxyl, epoxy or carboxyl group and acrylic acid, methacrylic acid, glycidyl acrylate, glycidyl methacrylate, hydroxyethyl acrylate, hydroxyethyl methacrylate, hydroxypropyl acrylate or hydroxypropyl methacrylate; adducts prepared from the hydroxyl-containing monomers mentioned above and methylolated melamine, urea or ethyl silicate by ether exchange reaction.

* * * * *

UNITED STATES PATENT AND TRADEMARK OFFICE
CERTIFICATE OF CORRECTION

PATENT NO. : 4199487
DATED : April 22, 1980
INVENTOR(S) : Yasuharu Nakayama, Tetsuo Aihara It is certified that error appears in the above—identified patent and that said Letters Patent is hereby corrected as shown below:

Title page, item [73], change the name of the assignee to read:

KANSAI PAINT COMPANY, LIMITED

Signed and Sealed this

First Day of July 1980

[SEAL]

Attest:

SIDNEY A. DIAMOND

Attesting Officer     Commissioner of Patents and Trademarks